United States Patent
Lim et al.

(10) Patent No.: US 8,826,711 B2
(45) Date of Patent: Sep. 9, 2014

(54) APPARATUS FOR MEASURING THE TEMPERATURE OF A ROLLING MATERIAL

(75) Inventors: Gapsoo Lim, Busan (KR); Yongkook Park, Anyang-si (KR)

(73) Assignee: Hyundai Steel Company, Incheon (KR)

( * ) Notice: Subject to any disclaimer, the term of this patent is extended or adjusted under 35 U.S.C. 154(b) by 0 days.

(21) Appl. No.: 13/310,667

(22) Filed: Dec. 2, 2011

(65) Prior Publication Data

US 2012/0073342 A1 Mar. 29, 2012

Related U.S. Application Data

(63) Continuation of application No. PCT/KR2010/004139, filed on Jun. 25, 2010.

(30) Foreign Application Priority Data

Jul. 24, 2009 (KR) .................. 10-2009-0068107

(51) Int. Cl.
*B21B 37/74* (2006.01)
*G01K 13/06* (2006.01)
(Continued)

(52) U.S. Cl.
CPC ............... *G01K 13/06* (2013.01); *G01K 1/146* (2013.01)
USPC ............... 72/12.2; 72/8.5; 72/19.1; 374/179; 374/141

(58) Field of Classification Search
CPC ........... B21D 1/02; B21D 3/05; B21D 7/025; B21D 1/06; B21D 5/02; B21B 37/26; B21B 37/74; B21B 37/16; B21B 37/44; B21B 1/26; B21B 37/50; B21B 37/52; B21B 37/48; B21B 27/10; B21B 37/46; B21B 37/54; B21C 31/00; B21C 1/30; B21C 1/12; B21C 29/04; B21C 3/14; B21C 23/30; G01B 11/26; G01K 13/002; G01K 7/01; G01K 1/14; G01K 7/42; G01K 1/16; G01K 13/08; G01K 13/06; G01K 1/024; G01K 13/10; G01K 7/21; G01J 5/08; G01J 5/041; G01J 2005/068; G01J 7/42

USPC ........... 72/12.2, 8.5, 11.3, 37, 7.4, 13.2, 16.5, 72/18.3, 19.1; 374/153, 154, 179, 100, 374/132, 172, 163, 141, 155; 700/153

See application file for complete search history.

(56) References Cited

U.S. PATENT DOCUMENTS 3,587,268 A * 6/1971 Bricmont et al. ............. 72/12.2
4,747,712 A * 5/1988 Gonoh et al. ................ 374/149
(Continued)

FOREIGN PATENT DOCUMENTS

| JP | 03-277931 A | 12/1991 |
| JP | 04-050625 A | 2/1992 |

(Continued)

OTHER PUBLICATIONS

Engineers Edge, accessed Aug. 8, 2012, Thermal Properties of Metals, Conductivity, Thermal Expansion, Specific Heat, http://www.engineersedge.com/properties_of_metals.htm.*

(Continued)

*Primary Examiner* — Shelley Self
*Assistant Examiner* — Lawrence Averick
(74) *Attorney, Agent, or Firm* — Knobbe Martens Olson & Bear LLP

(57) ABSTRACT

An apparatus for measuring the temperature of a rolling material is capable of accurately measuring the temperature of a rolling material by putting a temperature-measuring unit in contact with a surface of the rolling material that is extracted from a heating furnace and conveyed on a roller table to the next process, and moving the temperature-measuring unit contacting the surface of the rolling material together with the rolling material in the conveyed direction thereof.

11 Claims, 4 Drawing Sheets

(51) Int. Cl.
  *G01K 1/14*   (2006.01)
  *B21B 37/16*  (2006.01)
  *B21C 51/00*  (2006.01)
  *B21D 55/00*  (2006.01)
  *G01K 7/00*   (2006.01)
  *G01K 1/08*   (2006.01)

(56) References Cited

U.S. PATENT DOCUMENTS

| | | | |
|---|---|---|---|
| 7,004,626 B1 * | 2/2006 | Giberson et al. | 374/179 |
| 7,018,096 B2 * | 3/2006 | Benjamin | 374/179 |
| 7,029,173 B2 * | 4/2006 | Engel et al. | 374/179 |
| 2001/0002201 A1 * | 5/2001 | Kita et al. | 374/140 |
| 2004/0022298 A1 * | 2/2004 | Gunawardena et al. | 374/141 |
| 2007/0217480 A1 * | 9/2007 | Lai | 374/179 |
| 2008/0198900 A1 | 8/2008 | Myhre | |

FOREIGN PATENT DOCUMENTS

| | | |
|---|---|---|
| JP | 04-118536 A | 4/1992 |
| JP | 08-075562 A | 3/1996 |
| JP | 2000-088668 A | 3/2000 |
| JP | 2003-240645 A | 8/2003 |
| JP | 2004-264216 A | 9/2004 |
| KR | 10-0685084 B1 | 2/2007 |

OTHER PUBLICATIONS

International Search Report dated Feb. 28, 2011 of PCT/KR2010/004139 and its English Translation (4 pages).
Written Opinion dated Feb. 28, 2011 of PCT/KR2010/004139 (4 pages).

* cited by examiner

US 8,826,711 B2

APPARATUS FOR MEASURING THE TEMPERATURE OF A ROLLING MATERIAL

RELATED APPLICATION

This application is a continuation application under 35 U.S.C. §365(c) of International Application No. PCT/KR2010/004139, filed Jun. 25, 2010 designating the United States. This application further claims the benefit of the earlier filing date under 35 U.S.C. §365(b) of Korean Patent Application No. 10-2009-0068107 filed Jul. 24, 2009. This application incorporates herein by reference the International Application No. PCT/KR2010/004139 and the Korean Patent Application No. 10-2009-0068107 in their entirety.

TECHNICAL FIELD

The present disclosure relates, in general, to an apparatus for measuring the temperature of a rolling material.

BACKGROUND ART

Generally, a hot rolling process is a process that charges a rolling material, such as a slab, a bloom, or a billet, manufactured by continuous casting into a heating furnace, reheats the rolling material having a high temperature, and performs a rolling process, thus producing a rolled product.

The rolling process includes rough rolling, intermediate rolling, and finishing rolling which are performed sequentially.

The heating furnace is a device that moves and heats the rolling material that has been charged therein.

The interior space of the heating furnace is divided into a preheating zone, a heating zone, and a soaking zone, and the rolling material is heated to have a temperature suitable for rolling during moving of the rolling material.

SUMMARY

Accordingly, an aspect of the present invention is to provide an apparatus for measuring the temperature of a rolling material which means a material to be rolled, which is intended to accurately measure the temperature of the rolling material discharged from a heating furnace, thus precisely controlling the temperature in the heating furnace.

An embodiment of the present invention provides an apparatus for measuring a temperature of a rolling material, which includes a temperature-measuring unit making contact with a surface of the rolling material to measure the temperature of the rolling material; a first moving unit moving the temperature-measuring unit in a direction in which the rolling material is conveyed; and a second moving unit moving the temperature-measuring unit to put the temperature-measuring unit in contact with the surface of the rolling material.

An embodiment of the present invention is advantageous in that the temperature of a rolling material heated in a heating furnace and discharged therefrom can be accurately measured, and the temperature in the heating furnace can be precisely controlled to the measured temperature.

An embodiment of the present invention is advantageous in that a heating temperature of a heating furnace can be precisely controlled, thus improving the quality of a rolled product and increasing productivity.

Figure 1:
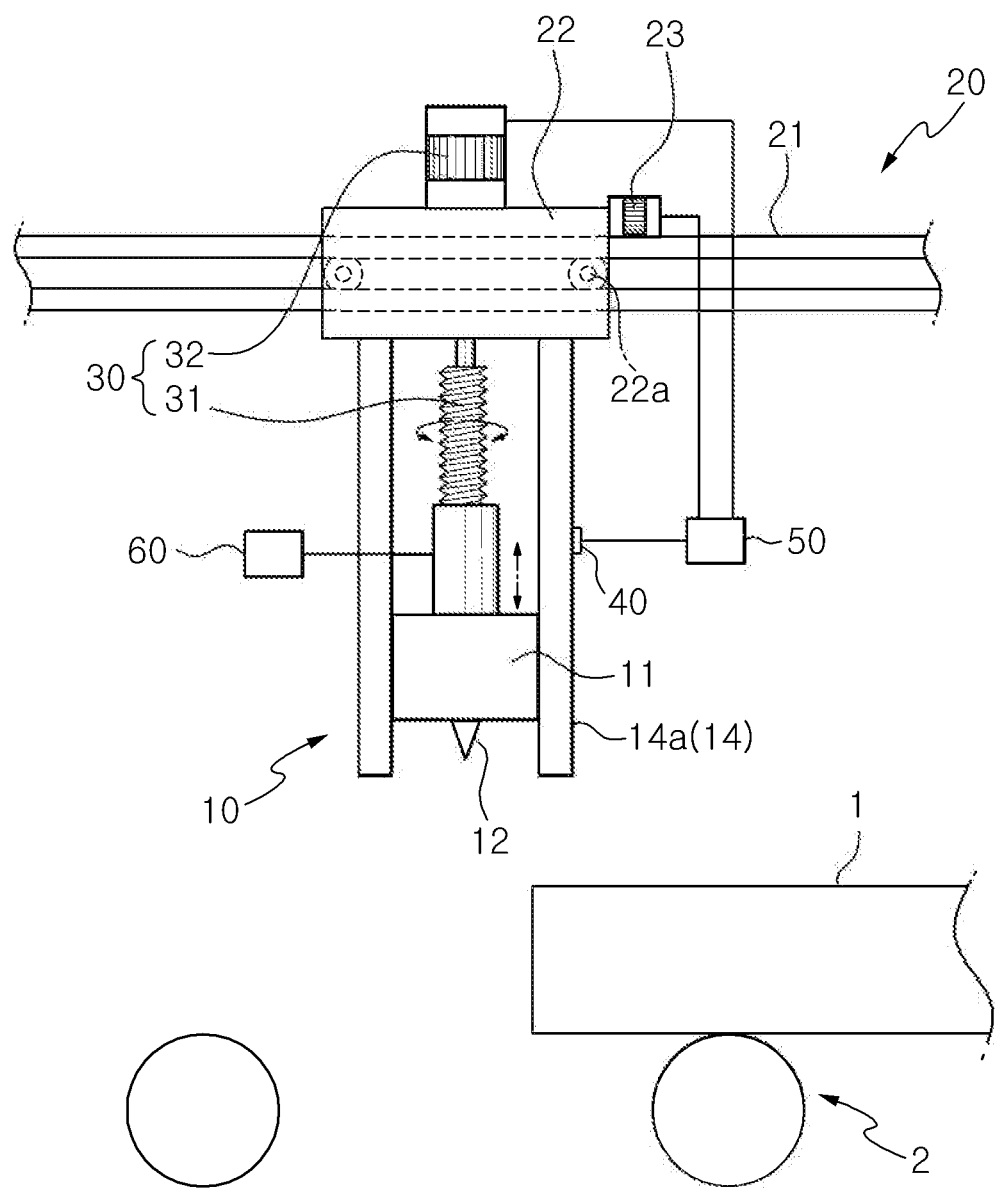
FIG. 1 is a schematic view showing the configuration according to embodiments of the present invention.

*Description of reference characters of important parts*

| | |
|---|---|
| 1: rolling material | 2: roller table |
| 10: temperature-measuring unit | 11: temperature-measuring main body |
| 12: probe | 13: temperature sensor |
| 14: movement guide | 20: first moving unit |
| 21: rail | 22: moving body |
| 23: drive motor | 30: second moving unit |
| 31: screw | 32: motor |
| 40: speed sensor | 50: control unit |
| 60: data storing unit | |

EMBODIMENTS

As shown in FIG. 1, the apparatus in accordance with embodiments of the present invention is placed on an outlet side of a heating furnace, and is installed above a roller table 2 which conveys a rolling material 1 that is heated in the heating furnace.

The heating furnace controls the atmospheric temperature in the heating furnace through combustion, thus controlling the temperature of the heated rolling material.

The operation of the heating furnace is controlled by predicting the temperature of the rolling material right after it is discharged from the heating furnace.

Thus, it is important to accurately measure the temperature of the rolling material which has been heated in and discharged from the heating furnace.

However, there is a limit to accurately predicting the temperature of the discharged rolling material.

Meanwhile, the temperature of a high-temperature object is measured by a non-contact radiation thermometer such as a pyrometer, and thus the temperature in the heating furnace to be controlled is available.

The non-contact radiation thermometer measures radiant energy emitted from the high-temperature object.

Since a large quantity of dust and vapor is generated in a steel mill where rolled products are produced, it is difficult to accurately measure the temperature using the non-contact radiation thermometer.

The apparatus in accordance with embodiments of the present invention includes a temperature-measuring unit 10 which makes contact with the surface of the rolling material 1 to measure the temperature of the rolling material 1 which means a material to be rolled.

The temperature-measuring unit 10 is moved by a second moving unit 30 to contact with the surface of the rolling material 1 which is conveyed by the roller table 2.

The second moving unit 30 moves the temperature-measuring unit 10 towards and away from the surface of the rolling material 1 to reciprocate the temperature-measuring unit 10 within a predetermined range.

The temperature-measuring unit 10 includes a temperature-measuring main body 11, a probe 12, and a temperature sensor 13. The temperature-measuring main body is moved by the second moving unit 30. The probe has a sharp tip, is filled with a filling material 12a for transferring heat, is provided on an end of the temperature-measuring main body 11, and is able to stick into the rolling material 1 by the operation of the second moving unit 30. The temperature sensor is embedded in the probe 12 and detects a temperature.

Preferably, the temperature-measuring unit 10 further includes a movement guide 14 which guides the movement of the temperature-measuring main body 11.

According to an embodiment, the temperature-measuring unit 10 is installed above the roller table 2 in such a way that the tip of the probe 12 faces downwards, and the second moving unit 30 moves the temperature-measuring unit 10 up and down.

Although not shown in the drawings, the temperature-measuring unit 10 may be installed under the roller table 2 in such a way that the tip of the probe 12 faces upwards.

Further, the temperature-measuring unit 10 may be installed on a side of the roller table 2, and may move horizontally to be put in contact with the side surface of the rolling material 1.

The direction in which the temperature-measuring unit 10 moves may be variously changed depending on the position at which the temperature-measuring unit is installed, and thus the construction of the second moving unit 30 may be variously changed.

Figure 2:
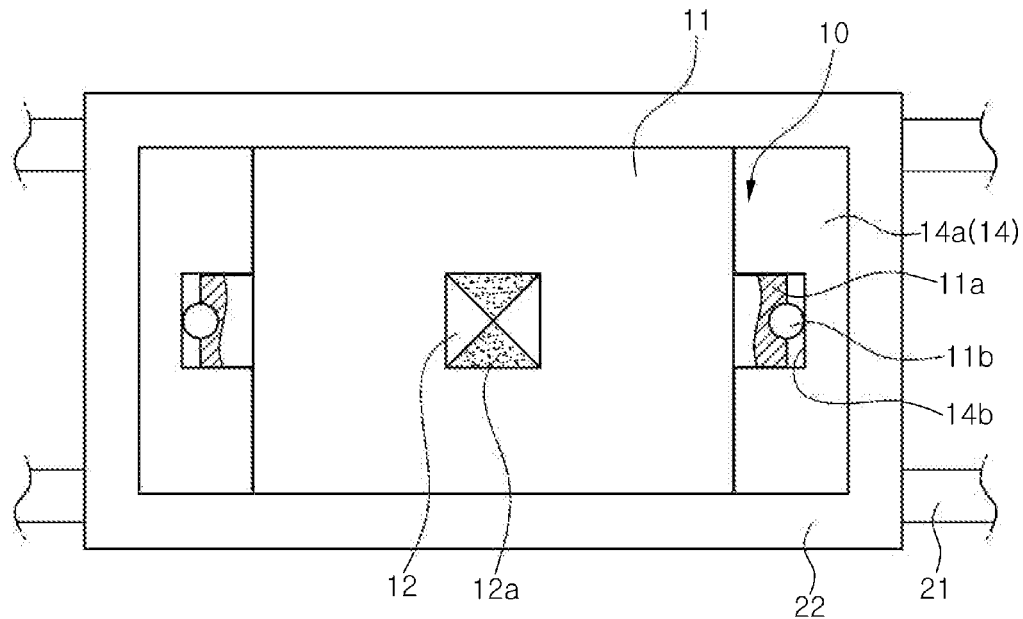
FIG. 2 is a bottom view of an embodiment of the present invention.
Figure 3:
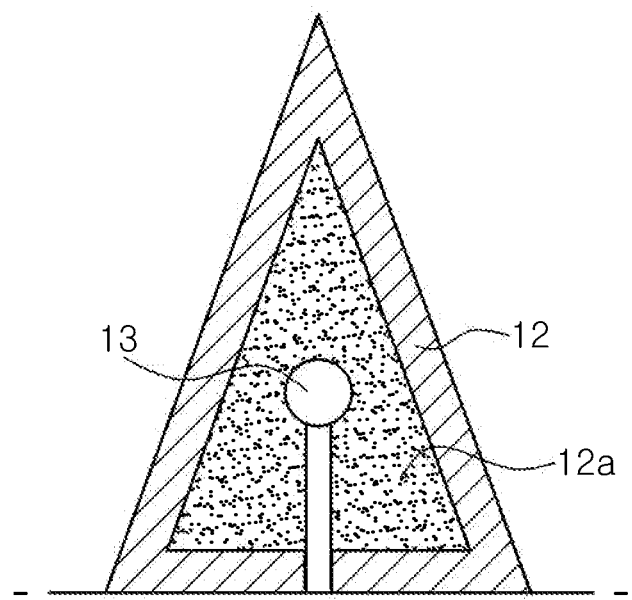
FIG. 3 is an enlarged sectional view showing important parts of an embodiment of the present invention.

As shown in FIG. 2, the movement guide 14 includes a pair of guide frames 14a which are spaced apart from each other in such a way as to correspond to the direction in which the second moving unit 30 moves. Guide grooves 14b are formed surfaces of the guide frames that face each other to extend longitudinally.

Further, the temperature-measuring main body 11 is placed between the guide frames 14a.

Movement guide protrusions 11a protrude from opposite side surfaces of the temperature-measuring main body 11, and are movably inserted into the guide grooves 14b of the guide frames 14a.

A ball 11b is inserted into each of the movement guide protrusions 11a in such a way as to protrude therefrom, and rolls while coming into contact with the inner surface of each of the guide grooves 14b.

That is, when the temperature-measuring main body 11 is moved by the second moving unit 30, the movement guide protrusions 11a move along the guide grooves 14b of the guide frames 14a and reciprocate in a vertical direction.

Further, each ball 11b rolls while contacting with the inner surface of the corresponding guide groove 14b, and thus the temperature-measuring main body 11 can move smoothly.

The probe 12 is manufactured of an alloy, for example, a hard metal which is high in hardness and heat conductivity.

The tip of the probe 12 is formed to be sharp, so that it becomes stuck in the surface of the rolling material 1 and is inserted into the rolling material 1.

Further, at least one surface of the probe 12 is preferably open so that the filling material 12a filling the probe is exposed.

The temperature sensor 13 is embedded in the filling material 12a to measure the temperature of the rolling material 1.

The temperature sensor 13 basically uses a thermocouple. The thermocouple is a device that is made of two kinds of metals to measure a wide range of temperature using the Seebeck effect, and a detailed description thereof will be omitted.

The filling material 12a uses any one of silver, copper, gold, and aluminum which are high in heat conductivity, thus smoothly transferring the temperature of the rolling material 1 to the thermocouple inserted into the filling material.

Meanwhile, the rolling material 1 is discharged from the heating furnace and thereafter is conveyed to the next process by the roller table 2.

Further, the temperature-measuring unit 10 reciprocates linearly in the direction in which the rolling material 1 is conveyed, by a first moving unit 20 which is installed at the outlet side of the heating furnace.

The first moving unit 20 includes a rail 21 which is provided above the roller table 2 in such a way as to be placed in the direction in which the rolling material 1 is conveyed, and a moving body 22 which reciprocates linearly along the rail 21.

The moving body 22 is provided with a plurality of wheels 22a which are coupled to the rail 21 in such a way as to roll.

Further, the first moving unit 20 includes a drive motor 23 which rotates at least one of the wheels 22a to linearly reciprocate the moving body 22, and a power transmission means (not shown) which transmits the rotating force of the drive motor 23 to the wheels 22a.

The power transmission means functions to transmit the rotating force of the drive motor 23 to the wheels 22a, and a detailed description thereof will be omitted.

That is, if the wheels 22a are rotated and rolled by the forward and backward rotation of the drive motor 23, the moving body 22 reciprocates linearly along the rail 21.

Meanwhile, the temperature-measuring unit 10 is moved up and down by the second moving unit 30, and this causes the probe 12 to be stuck into the surface of the rolling material 1 which is conveyed by the roller table 2 after being discharged from the heating furnace, or cause the probe 12 to be pulled out of the surface of the rolling material 1.

The second moving unit 30 includes a screw 31 which is rotatably set up between the guide frames 14a and is screwed to an upper portion of the temperature-measuring main body 11, and a motor 32 which rotates the screw 31 forwards and backwards.

The motor 32 is supplied with electric power and generates a rotating force. The generated rotating force is transmitted through a reduction gear box (not shown) which is connected to the screw 31.

The motor 32 rotates forwards or backwards using the electric power supplied to the motor, thereby generating a rotating force.

The rotating force of the motor 32 is transmitted through the reduction gear box to the screw 31, and thus the screw 31 rotates.

The temperature-measuring main body 11 moves up and down along the screw 31 depending on the rotating direction of the screw 31.

Although not shown in the drawings, the second moving unit 30 may use a hydraulic cylinder which is installed above the roller table 2 in such a way that a piston rod thereof faces downwards.

An end of the piston rod of the hydraulic cylinder, which faces downwards, is connected to the upper portion of the temperature-measuring main body 11, and thus the temperature-measuring main body 11 is moved up and down by the operation of the piston rod.

In addition to the second moving unit 30 constructed as described above, any configuration which can move the temperature-measuring main body 11 to cause the temperature-measuring main body 11 to be put in contact with the surface of the rolling material 1 falls within the scope of the present invention.

Further, the apparatus in accordance with embodiments of the present invention includes a speed sensor 40, a control unit 50, and a data storing unit 60. The speed sensor detects the speed of the rolling material 1 conveyed by the roller table 2. The control unit is connected to the speed sensor 40, the first moving unit 20, and the second moving unit 30, thus the operation of the first moving unit 20 and the second moving unit 30 is controlled. The data storing unit is connected to the temperature-measuring unit 10 and stores data on detected temperature.

Preferably, the control unit 50 controls the operation of the first moving unit 20 so that the temperature-measuring unit 10 moves at the same speed as the conveying speed of the rolling material 1 detected by the speed sensor 40.

That is, the control unit 50 controls the rpm of the drive motor 23 to move the temperature-measuring unit 10 at the same speed as the conveying speed of the rolling material 1.

Further, the operation of the motor 32 of the second moving unit 30 is controlled, thus moving the temperature-measuring main body 11 up and down.

Further, the data storing unit 60 stores the temperature measured by the temperature sensor 13, thus providing data that may be used to control the temperature in the heating furnace.

The process of measuring the temperature of the rolling material 1 discharged from the heating furnace in accordance with embodiments of the present invention is as follows.

The rolling material 1 includes a slab or a bloom, a billet, etc. manufactured through continuous casting, and furthermore includes all materials used in the rolling process.

According to embodiments of the present invention, the probe 12 is installed above the roller table conveying the rolling material 1 discharged from the heating furnace in such a way as to face downwards.

Figure 4:
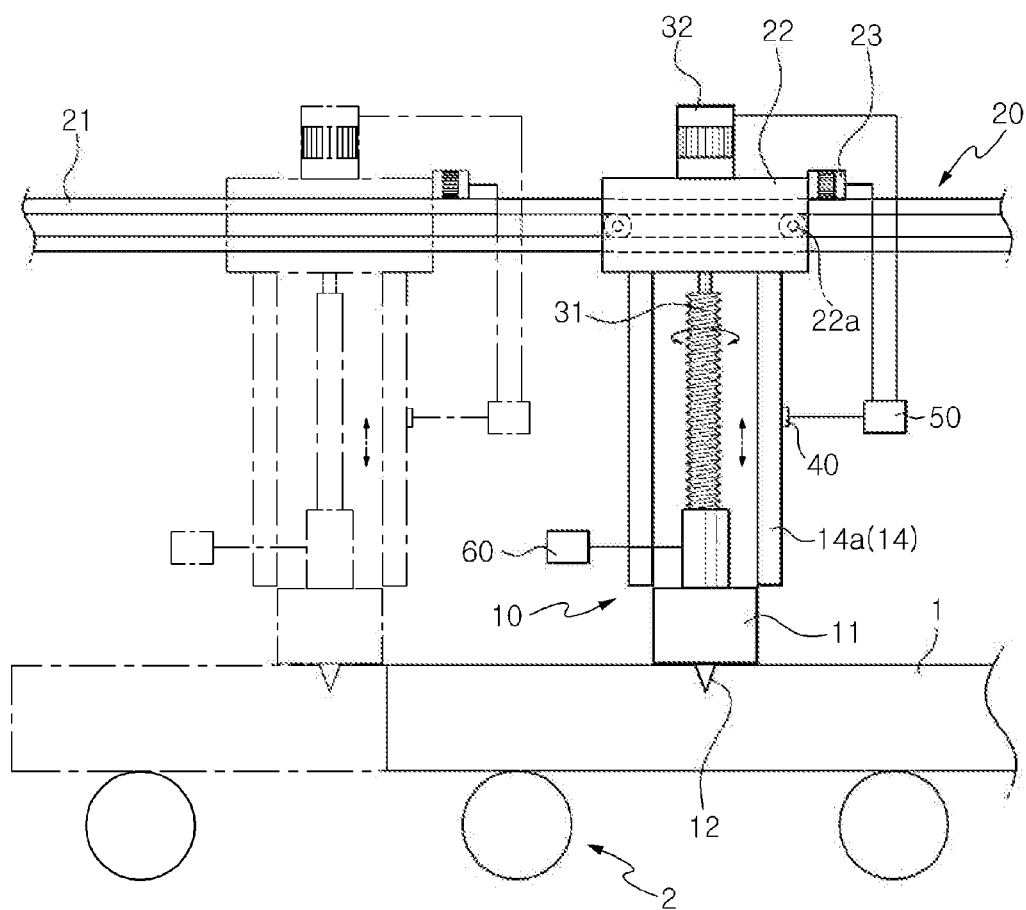
FIGS. 4 and 5 are views showing the use of embodiments of the present invention.
Figure 5:
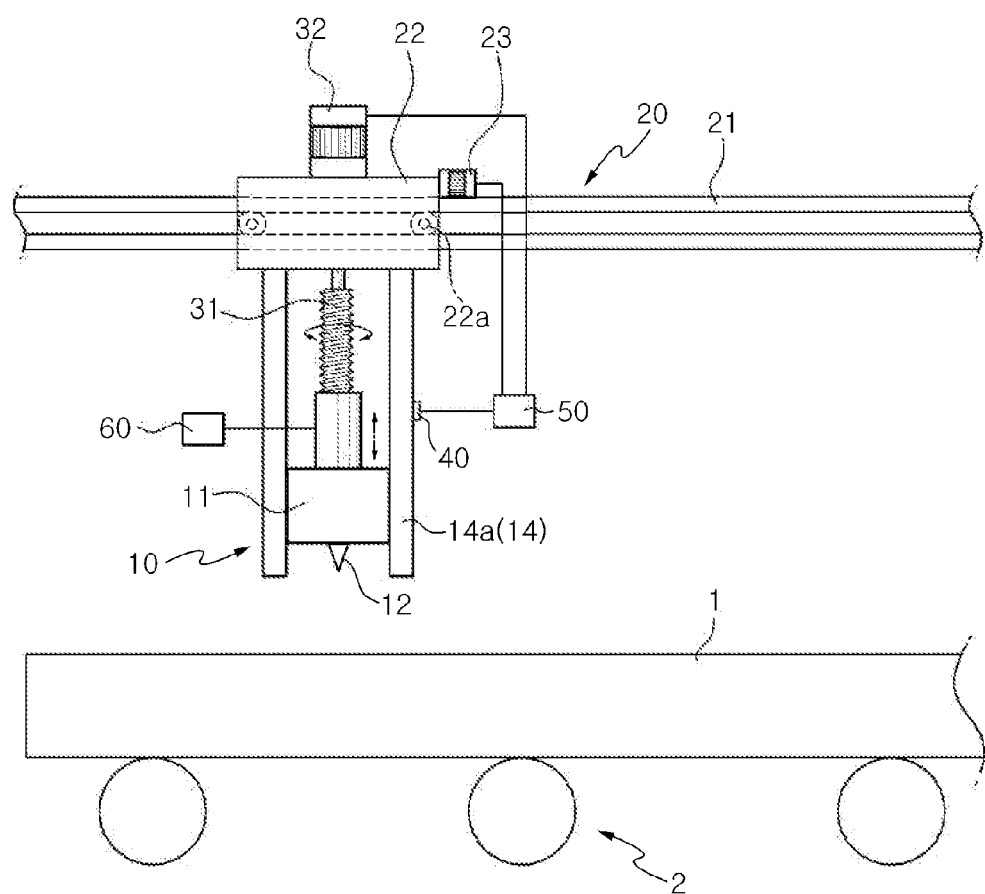

Further, as shown in FIG. 4, the temperature-measuring main body 11 is moved down by the second moving unit 30 while the rolling material 1 is discharged from the heating furnace and is conveyed along the roller table 2, so that the probe 12 is stuck and inserted into the surface of the rolling material 1.

The temperature-measuring main body 11 is moved at the same speed as the conveying speed of the rolling material 1 by the operation of the first moving unit 20, thus measuring the temperature of the rolling material 1.

In the state of the probe 12 being stuck into the surface of the rolling material 1, the temperature of the rolling material 1 is transferred through the filling material 12a to the temperature sensor 13, namely, the thermocouple, thus accurately measuring the temperature of the rolling material 1.

After the temperature has been measured as described above, the temperature-measuring main body 11 is moved up by the second moving unit 30, so that the probe 12 is pulled out of the surface of the rolling material 1.

Further, the temperature-measuring main body 11 is moved in a reverse direction by the first moving unit 20 to return to an original position.

While the above process is repeated, the temperatures of the rolling materials 1 discharged from the heating furnace are continuously detected, and the detected data are stored in the data storing unit 60.

In accordance with embodiments of the present invention, it is ensured that there is sufficient time to measure the temperature because the probe 12 moves at the same speed as the rolling material 1 while being stuck into the surface of the rolling material 1 that is being conveyed after being discharged from the heating furnace, thus accurate temperature measurement is available.

Further, the surface of the rolling material 1 is not damaged during the temperature measuring operation.

Therefore, in accordance with the present invention, the temperature of the rolling material 1 discharged from the heating furnace without damaging the surface can be accurately measured.

It is to be understood that the present invention is not limited to the specific embodiments and that various changes and modifications may be made without departing from the spirit and scope thereof.

What is claimed is:

1. An apparatus for measuring a temperature of a steel slab while the steel slab is being transferred in a first direction, the apparatus comprising:
    a temperature probe comprising a main body, a pointed tip and a temperature sensor, the pointed tip being connected to the main body and configured to poke into the steel slab and comprising an outer layer and a filler, the temperature sensor being embedded in the filler and configured to measure a temperature of the material while the pointed tip is in contact with the steel slab by poking;
    a first moving mechanism configured to move the probe along the first direction while the steel slab is being transferred in the first direction; and
    a second moving mechanism configured to move the probe along a second direction perpendicular to a substantially planar top surface of the steel slab toward and away from the steel slab,
    wherein the second mechanism comprises:
        two opposing guide frames spaced apart from each other, each guide frame comprising a guide groove extending in the second direction perpendicular to the substantially planar top surface of the steel slab,
        two guide protrusions, each of which extends from the main body of the probe to one of the guide grooves and is engaged with one of the guide grooves, and
        a leadscrew located between the guide frames, engaged with the probe and configured to rotate so as to move the probe in the second direction to poke into the steel slab.

2. The apparatus of claim 1, wherein the outer layer comprises at least one opening, and a portion of the filler is exposed through the at least one opening.

3. The apparatus of claim 1, wherein the filler is more heat conductive than the outer layer.

4. The apparatus of claim 1, wherein the filler is of at least one selected from the group consisting of silver, copper, gold, and aluminum.

5. The apparatus of claim 1, wherein the outer layer is of a metal is harder than the filler.

6. The apparatus of claim 1, wherein the temperature sensor comprises a thermocouple.

7. The apparatus of claim 1, wherein the first moving mechanism is further configured to move the second moving mechanism along the first direction.

8. The apparatus of claim 1, wherein the first moving mechanism is further configured to move the temperature probe at substantially the same speed as that of the material in the first direction.

9. A method of making a rolled steel, the method comprising: providing the apparatus of claim 1; heating a steel slab; transferring the heated steel slab in the first direction; moving the temperature probe of the apparatus of claim 1 toward the steel slab in the second direction until at least a portion of the pointed tip pokes into the surface of the heated steel slab; moving the temperature probe along the first direction while at least a portion of the tip is in contact with the heated steel slab by poking; measuring a temperature of the steel slab while moving the temperature probe along the first direction; and rolling the heated steel slab into a rolled steel.

10. The method of claim 9, wherein the steel slab is heated in a furnace, wherein the method further comprises conducting a feedback control of a temperature of the inside of the furnace using the measured temperature.

11. The method of claim 10, wherein the temperature is measured after the heated steel slab is transferred out of the furnace.

* * * * *